United States Patent
Manery

(10) Patent No.: US 6,979,504 B2
(45) Date of Patent: Dec. 27, 2005

(54) FUEL CELL SYSTEM AUTOMATIC POWER SWITCHING METHOD AND APPARATUS

(75) Inventor: David S. Manery, Coquitlam (CA)

(73) Assignee: Ballard Power Systems Inc., Burnaby (CA)

( * ) Notice: Subject to any disclaimer, the term of this patent is extended or adjusted under 35 U.S.C. 154(b) by 533 days.

(21) Appl. No.: 09/916,239

(22) Filed: Jul. 25, 2001

(65) Prior Publication Data

US 2003/0022031 A1 Jan. 30, 2003

(51) Int. Cl.$^7$ .......................... H01M 8/04; H01M 16/00
(52) U.S. Cl. ........................ 429/13; 429/9; 429/23; 320/101
(58) Field of Search ................... 429/9, 13, 22, 429/23; 320/101

(56) References Cited

U.S. PATENT DOCUMENTS

| | | | |
|---|---|---|---|
| 2,988,656 A | 6/1961 | Grobel | 310/53 |
| 3,061,658 A | 10/1962 | Blackmer | 136/86 |
| 3,317,348 A | 5/1967 | Winsel | 136/86 |
| 3,383,580 A | 5/1968 | Wallace | 320/48 |
| 3,452,347 A | 6/1969 | Stimson | 340/249 |
| 3,553,026 A | 1/1971 | Winsel | 136/86 |
| 3,580,741 A | 5/1971 | Hovious et al. | 136/86 |
| 3,600,234 A | 8/1971 | Massie, Jr. | 136/182 |
| 3,615,842 A | 10/1971 | Craft et al. | 136/86 |
| 3,666,562 A | 5/1972 | Sprengel | 136/86 B |
| 3,697,325 A | 10/1972 | Baude | 136/86 B |
| 3,775,282 A | 11/1973 | Craft et al. | 204/266 |
| 3,808,534 A | 4/1974 | Summers et al. | 340/249 |
| 3,850,696 A | 11/1974 | Summers et al. | 136/86 B |
| 3,891,465 A | 6/1975 | Muto et al. | 136/182 |
| 3,935,028 A | 1/1976 | Strasser et al. | 136/86 B |
| 3,949,545 A | 4/1976 | Chihara | 58/23 BA |
| 3,969,697 A | 7/1976 | Iwasa et al. | 340/248 B |
| 3,996,579 A | 12/1976 | Dahl | 340/249 |
| 4,037,024 A | 7/1977 | Landau | 429/17 |
| 4,078,893 A | 3/1978 | Gilman et al. | 23/253 |

(Continued)

FOREIGN PATENT DOCUMENTS

| | | |
|---|---|---|
| EP | 136 187 A2 | 4/1985 |
| EP | 917 225 A1 | 5/1999 |

(Continued)

OTHER PUBLICATIONS

Jake de Vaal and Harvindra Deo, "Fuel Cell Ambient Enviroment Monitoring and Control Apparatus and Method," U.S. Appl. No. 09/916,241, Jul. 25, 2001.

(Continued)

*Primary Examiner*—Jonathan Crepeau
(74) *Attorney, Agent, or Firm*—Seed IP Law Group PLLC

(57) ABSTRACT

A fuel cell system includes a fuel cell stack, a battery, and a control system. A power circuit couples the fuel cell system selectively between the fuel cell stack and the battery. The power circuit includes a battery supply switch responsive to a voltage across the fuel cell stack, and a stack supply switch responsive to an operating state of the fuel cell system. The battery supply switch uncouples the battery from an on-board power supply when a voltage across the fuel cell stack exceeds a first threshold voltage and couples the battery to the on-board power supply when the fuel cell stack voltage is less than a second threshold voltage. The stack supply switch couples power the fuel cell stack to the on-board power supply when in a running state. A diode-OR circuit couples the source with the highest potential to the on-board power supply.

22 Claims, 11 Drawing Sheets

U.S. PATENT DOCUMENTS

| | | | |
|---|---|---|---|
| 4,085,255 A | 4/1978 | Grave et al. | 429/26 |
| 4,197,675 A | 4/1980 | Kelly | 49/31 |
| 4,243,731 A | 1/1981 | Cheron | 429/13 |
| 4,310,606 A | 1/1982 | Maida | 429/93 |
| 4,424,491 A | 1/1984 | Bobbett et al. | 324/433 |
| 4,649,537 A | 3/1987 | Rosswurm et al. | 371/16 |
| 4,729,931 A | 3/1988 | Grimble | 429/17 |
| 4,816,768 A | 3/1989 | Champlin | 324/428 |
| 4,826,741 A | 5/1989 | Aldhart et al. | 429/19 |
| 4,829,290 A | 5/1989 | Ford | 340/663 |
| 5,074,137 A | 12/1991 | Harris et al. | 73/31.02 |
| 5,132,663 A | 7/1992 | Strobl et al. | 340/438 |
| 5,139,894 A | 8/1992 | Mizuno et al. | 429/9 |
| 5,199,396 A | 4/1993 | Shelef et al. | 123/198 D |
| 5,325,367 A | 6/1994 | Dekker et al. | 371/21.1 |
| 5,392,873 A | 2/1995 | Masuyama et al. | 180/68.5 |
| 5,397,655 A | 3/1995 | Bette et al. | 429/13 |
| 5,478,662 A | 12/1995 | Strasser | 429/13 |
| 5,482,790 A | 1/1996 | Yamada et al. | 429/9 |
| 5,503,944 A | 4/1996 | Meyer et al. | 429/13 |
| 5,631,532 A | 5/1997 | Azuma et al. | 320/5 |
| 8,763,113 | 6/1998 | Meltser et al. | 429/13 |
| 5,869,952 A | 2/1999 | Fisher et al. | 320/136 |
| 5,939,218 A | 8/1999 | Mizuno | 429/23 |
| 5,945,229 A | 8/1999 | Meltser | 429/13 |
| 6,028,414 A | 2/2000 | Chouinard et al. | 320/110 |
| 6,048,473 A | 4/2000 | Denda et al. | 252/376 |
| 6,066,408 A | 5/2000 | Vitale et al. | 429/26 |
| 6,093,500 A | 7/2000 | Margiott et al. | 429/13 |
| 6,093,502 A | 7/2000 | Carlstrom, Jr. et al. | 429/25 |
| 6,124,054 A | 9/2000 | Gorman et al. | 429/34 |
| 6,140,820 A | 10/2000 | James | 324/434 |
| 6,159,626 A | 12/2000 | Keskula et al. | 429/22 |
| 6,162,556 A | 12/2000 | Vollmar et al. | 429/17 |
| 6,171,718 B1 | 1/2001 | Murach et al. | 429/13 |
| 6,242,120 B1 | 6/2001 | Herron | 429/22 |
| 6,290,594 B1 | 9/2001 | Osborne | 454/75 |
| 6,362,540 B1 | 3/2002 | Hill | 307/52 |
| 6,387,556 B1 * | 5/2002 | Fuglevand et al. | 429/22 |
| 6,423,434 B1 | 7/2002 | Pratt et al. | 426/13 |
| 6,426,158 B1 | 7/2002 | Pratt et al. | 429/13 |
| 6,455,181 B1 | 9/2002 | Hallum | 429/13 |
| 6,461,751 B1 | 10/2002 | Boehm et al. | 429/13 |
| 6,492,043 B1 | 12/2002 | Knights et al. | 429/13 |
| 6,497,971 B1 | 12/2002 | Reiser | 429/13 |
| 6,519,510 B1 | 2/2003 | Margiott et al. | 700/299 |
| 6,558,826 B1 | 5/2003 | Walsh | 429/17 |
| 6,569,549 B1 | 5/2003 | Sawyer | 429/13 |
| 6,677,066 B1 | 1/2004 | Jansen et al. | 429/7 |
| 2001/0014415 A1 | 8/2001 | Iio et al. | 429/22 |
| 2001/0018142 A1 | 8/2001 | Kato et al. | 429/22 |
| 2002/0076583 A1 | 6/2002 | Reiser et al. | 429/13 |
| 2002/0094467 A1 | 7/2002 | Nonobe et al. | 429/34 |
| 2002/0094468 A1 | 7/2002 | Miura et al. | 429/34 |
| 2002/0094469 A1 | 7/2002 | Yoshizumi et al. | 429/34 |
| 2003/0003333 A1 | 1/2003 | Haridoss | 429/22 |
| 2003/0022036 A1 | 1/2003 | Parr | |
| 2003/0022037 A1 | 1/2003 | Parr et al. | |
| 2003/0022038 A1 | 1/2003 | Vaal et al. | |
| 2003/0022040 A1 | 1/2003 | Wells | |
| 2003/0022041 A1 | 1/2003 | Barton | |
| 2003/0022042 A1 | 1/2003 | Wells | |
| 2003/0022045 A1 | 1/2003 | Wells | |
| 2003/0022050 A1 | 1/2003 | Barton et al. | |

FOREIGN PATENT DOCUMENTS

| | | |
|---|---|---|
| EP | 982 788 A2 | 3/2000 |
| EP | 1 018 744 A1 | 7/2000 |
| EP | 1 037 041 A2 | 9/2000 |
| EP | 1 091 436 A1 | 4/2001 |
| EP | 1 091 437 A1 | 4/2001 |
| EP | 1 111 703 A2 | 6/2001 |
| EP | 1 187 241 A2 | 3/2002 |
| GB | 1223941 | 3/1971 |
| GB | 1396157 | 6/1975 |
| GB | 60-158557 | 8/1985 |
| JP | 01-089155 | 4/1989 |
| JP | 6-243886 | 9/1994 |
| JP | 07-169481 | 7/1995 |
| JP | 08-088014 | 4/1996 |
| JP | 08-185879 | 7/1996 |
| JP | 08-250139 | 9/1996 |
| WO | WO 91/19328 | 12/1991 |
| WO | WO 94/09519 | 4/1994 |
| WO | WO 99/28985 | 6/1999 |
| WO | WO 00/02282 | 1/2000 |
| WO | WO 00/74162 A1 | 12/2000 |
| WO | WO 01/26173 A1 | 4/2001 |
| WO | WO 01/26174 A1 | 4/2001 |
| WO | WO 01/43216 A2 | 6/2001 |
| WO | WO 02/23658 A1 | 3/2002 |

OTHER PUBLICATIONS

Robert Kenneth Parr, "Fuel Cell Controller Self Inspection," U.S. Appl. No. 09/916,117, Jul. 25, 2001.

Brian Wells, "Fuel Cell Anomaly Detection Method and Apparatus," U.S. Appl. No. 09/916,115, Jul. 25, 2001.

Russell Howard Barton et al., "Fuel Cell Purging Method and Apparatus," U.S. Appl. No. 09/916,211, Jul. 25, 2001.

Brian Wells et al., "Fuel Cell Resuscitation Method and Apparatus," U.S. Appl. No. 09/916,213, Jul. 25, 2001.

Robert Kenneth Parr and Brian Wells, "Fuel Cell System Method, Apparatus and Scheduling," U.S. Appl. No. 09/916,240, Jul. 25, 2001.

Russell Howard Barton and Tan Duc Uong, "Product Water Pump for Fuel Cell System," U.S. Appl. No. 09/916,118, Jul. 25, 2001.

Brian Wells and Kenneth W. Strang, "Fuel Cell System Having a Hydrogen Sensor," U.S. Appl. No. 09/916,212, Jul. 25, 2001.

Abstract of JP 60–212966, asp@cenet database, Oct. 25, 1985.

Abstract of JP 63–029460, esp@cenet database, Feb. 8, 1988.

Abstract of JP 63–241876, esp@cenet database, Oct. 7, 1988.

Abstact of JP 2–078159, esp@cenet database, Mar. 19, 1990.

Abstract of JP 4–115467, esp@cenet database, Apr. 16, 1992.

Abstract of JP 4–220955, esp@cenet database, Aug. 11, 1992.

Abstract of JP 6–084536, esp@cenet database, Mar. 25, 1994.

Abstract of JP 7–325075, esp@cenet database, Dec. 12, 1995.

Abstract of JP 8–162138, esp@cenet database, Jun. 21, 1996.

Abstract of JP 2000–009685, esp@cenet database, Jan. 14, 2000.

Semiconductor Device, URL=http://www.search.eb.com/eb/article!query=bipolar+transistor&ct=&eu=108510&tocid=34330, download date Feb. 4, 2004.

* cited by examiner

FUEL CELL SYSTEM AUTOMATIC POWER SWITCHING METHOD AND APPARATUS

BACKGROUND OF THE INVENTION

1. Technical Field

The present invention relates to fuel cells, and particularly to the operation of fuel cell systems.

2. Description of the Related Art

Electrochemical fuel cells convert fuel and oxidant to electricity. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell.

Due to their zero- or low-emission nature, and ability to operate using renewable fuels, the use of fuel cells as primary and/or backup power supplies is likely to become increasingly prevalent. For example, a fuel cell stack can serve as an uninterruptible power supply for computer, medical, or refrigeration equipment in a home, office, or commercial environment. Other uses are of course possible.

SUMMARY OF THE INVENTION

Fuel cell system electronic monitoring and control circuitry requires power from a power source such as a battery or fuel cell stack. While a battery may be recharged by the fuel cell stack, the battery may be depleted where there is prolonged reliance on the battery, or where the fuel cell stack is supplying insufficient power to a load. Consequently, there is a need for improved control systems for fuel cell systems, and for methods of controlling such fuel cell systems, particularly systems and methods for switching electronic monitoring and control circuitry between power sources such as a battery and a fuel stack.

In one aspect, a fuel cell system includes a fuel cell stack, a battery, and a fuel cell control system, including a power supply switch configured to selectively couple power from the fuel cell stack to the fuel cell control system at a first time, and to selectively couple power from the battery to the fuel cell control system at a second time. The power supply switch can be responsive to a voltage across the fuel cell stack. For example, the power supply switch can couple power from the fuel cell stack to the fuel cell control system at the first time while a voltage across the fuel cell stack is above a fuel cell stack threshold voltage and couple power from the battery to the fuel cell control system at the second time while the voltage across the fuel cell stack is below the fuel cell stack threshold voltage. The power switch can be responsive to different fuel cell stack threshold voltages. Additionally, or alternatively, the power supply switch can be responsive to an operating state of the fuel cell system. Thus, the power draw on the battery may be substantially reduced.

In another aspect, a fuel cell system includes a power supply switch configured to selectively couple power from the fuel cell stack to the microcontroller at a first time, and to selectively couple power from the battery to the microcontroller at a second time.

In yet another aspect, a fuel cell control system includes a microcontroller, at least one sensor, at least one actuator, and a power supply switch configured to selectively switch power from the fuel cell stack to the microcontroller when a voltage across the fuel cell stack is above a first fuel cell stack threshold voltage and to selectively switch power from the battery to the microcontroller when the voltage across the fuel cell stack is below a second fuel cell stack voltage.

In still another aspect, a fuel cell control system includes a microcontroller, at least one sensor, at least one actuator, and a power supply switch configured to selectively switch power from the fuel cell stack to the microcontroller in a first operating state when a voltage across the fuel cell stack is above a first fuel cell stack threshold voltage and to selectively switch power from the battery to the microcontroller in the first operating state when the voltage across the fuel cell stack is below a second fuel cell stack voltage.

In a yet a further aspect, a controller-readable media, such as an on-chip flash memory of a microcontroller, can carry instructions for causing the controller to operate a fuel cell system by coupling power from the fuel cell stack to the controller when a voltage across the fuel cell stack moves above a first threshold voltage, and coupling power from the battery to the controller when the voltage across the fuel cell stack drops below a second threshold voltage.

In still a further aspect, a method of operating a fuel cell system includes providing power from a fuel cell stack to a fuel cell control system at a first time, and providing power from a battery to the fuel cell control system at a second time.

In yet still a further aspect, a method of operating a power supply switch in a fuel cell system includes changing a state of a stack supply switch to couple the fuel cell stack to the on-board power supply when entering a running operational state of the fuel cell system from a starting operational state of the fuel cell system; setting a state of a battery supply switch to uncouple the battery from the on-board power supply if a voltage across the fuel cell stack is above an upper fuel cell stack threshold voltage; setting the state of the battery supply switch to couple power the battery to the on-board power supply if the voltage across the fuel cell stack falls below a lower fuel cell stack threshold voltage; and changing the state of the stack supply switch to couple the battery to the on-board power supply when entering a stopping operational state of the fuel cell system from the running operational state.

BRIEF DESCRIPTION OF THE DRAWINGS

In the drawings, identical reference numbers identify similar elements or acts. The sizes and relative positions of elements in the drawings are not necessarily drawn to scale.

For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, have been selected solely for ease of recognition in the drawings.

DETAILED DESCRIPTION OF PREFERRED EMBODIMENTS

In the following description, certain specific details are set forth in order to provide a thorough understanding of various embodiments of the invention. However, one skilled in the art will understand that the invention may be practiced without these details. In other instances, well known structures associated with fuel cells, microcontrollers, sensors, and actuators have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Fuel Cell System Overview

Figure 1:
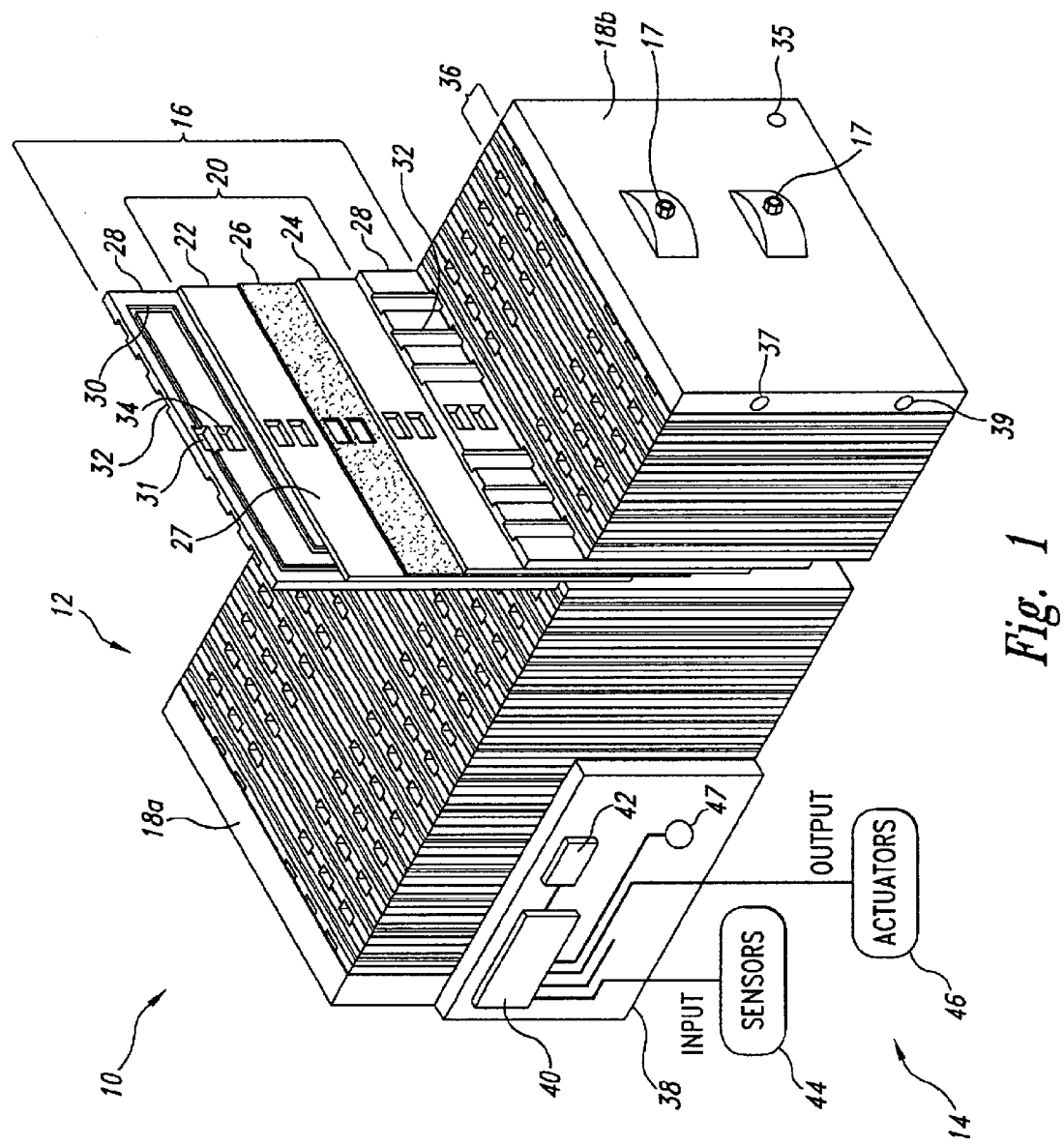
FIG. 1 is an isometric, partially exploded, view of a fuel cell system including a fuel cell stack and controlling electronics including a fuel cell monitoring and control system.

FIG. 1 shows a portion of a fuel cell system 10, namely, a fuel cell stack 12 and an electronic fuel cell monitoring and control system 14. Fuel cell stack 12 includes a number of fuel cell assemblies 16 arranged between a pair of end plates 18a, 18b, one of the fuel cell assemblies 16 being partially removed from fuel cell stack 12 to better illustrate the structure of fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 includes a membrane electrode assembly 20 including two electrodes, the anode 22 and the cathode 24, separated by an ion exchange membrane 26. Electrodes 22, 24 can be formed from a porous, electrically conductive sheet material, such as carbon fiber paper or cloth, that is permeable to the reactants. Each of electrodes 22, 24 is coated on a surface adjacent the ion exchange membrane 26 with a catalyst 27, such as a thin layer of platinum, to render each electrode electrochemically active.

Fuel cell assembly 16 also includes a pair of separator plates or flow field plates 28 sandwiching membrane electrode assembly 20. In the illustrated embodiment, each of flow field plates 28 includes one or more reactant channels 30 formed on a planar surface of flow field plate 28 adjacent an associated one of electrodes 22, 24 for carrying fuel to anode 22 and oxidant to cathode 24, respectively. (Reactant channel 30 on only one of flow field plates 28 is visible in FIG. 1.) Reactant channels 30 that carry the oxidant also carry exhaust air and product water away from cathode 24. As will be described in more detail below, fuel stack 12 is designed to operate in a dead-ended fuel mode, thus substantially all of the hydrogen fuel supplied to it during operation is consumed, and little if any hydrogen is carried away from stack 12 in normal operation of system 10. However, embodiments of the present invention can also be applicable to fuel cell systems operating on dilute fuels which are not dead-ended.

In the illustrated embodiment, each flow field plate 28 preferably includes a plurality of cooling channels 32 formed on the planar surface of the flow field plate 28 opposite the planar surface having reactant channel 30. When the stack is assembled, the cooling channels 32 of each adjacent fuel cell assembly 16 cooperate so that closed cooling channels 32 are formed between each membrane electrode assembly 20. Cooling channels 32 transmit cooling air through fuel cell stack 12. Cooling channels 32 are preferably straight and parallel to each other, and traverse each plate 28 so that cooling channel inlets and outlets are located at respective edges of plate 28.

While the illustrated embodiment includes two flow field plates 28 in each fuel cell assembly 16, other embodiments can include a single bipolar flow field plate (not shown) between adjacent membrane electrode assemblies 20. In such embodiments, a channel on one side of the bipolar plate carries fuel to the anode of one adjacent membrane electrode assembly 20, while a channel on the other side of the plate carries oxidant to the cathode of another adjacent membrane electrode assembly 20. In such embodiments, additional flow field plates 28 having channels for carrying coolant (e.g., liquid or gas, such as cooling air) can be spaced throughout fuel cell stack 12, as needed to provide sufficient cooling of stack 12.

End plate 18a includes a fuel stream inlet port (not shown) for introducing a supply fuel stream into fuel cell stack 12. End plate 18b includes a fuel stream outlet port 35 for discharging an exhaust fuel stream from fuel cell stack 12 that comprises primarily water and non-reactive components and impurities, such as any introduced in the supply fuel stream or entering the fuel stream in stack 12. Fuel stream outlet port 35 is normally closed with a valve in dead-ended operation. Although fuel cell stack 12 is designed to consume substantially all of the hydrogen fuel supplied to it during operation, traces of unreacted hydrogen may also be discharged through the fuel stream outlet port 35 during a purge of fuel cell stack 12, effected by temporarily opening a valve at the fuel stream outlet port 35. Each fuel cell assembly 16 has openings formed therein to cooperate with corresponding openings in adjacent assemblies 16 to form internal fuel supply and exhaust manifolds (not shown) that extend the length of stack 12. The fuel stream inlet port is fluidly connected to fluid outlet port 35 via respective reactant channels 30 that are in fluid communication with the fuel supply and exhaust manifolds, respectively.

The end plate 18b includes an oxidant stream inlet port 37 for introducing supply air (oxidant stream) into fuel cell stack 12, and an oxidant stream outlet port 39 for discharging exhaust air from fuel cell stack 12. Each fuel cell assembly 16 has openings 31, 34, formed therein to cooperate with corresponding openings in adjacent fuel cell assemblies 16 to form oxidant supply and exhaust manifolds that extend the length of stack 12. Oxidant inlet port 37 is fluidly connected to the oxidant outlet port 39 via respective reactant channels 30 that are in fluid communication with oxidant supply and exhaust manifolds, respectively.

In one embodiment, fuel cell stack 12 includes forty-seven fuel cell assemblies 16. (FIGS. 1 and 2 omit a number of the fuel cell assemblies 16 to enhance drawing clarity). Fuel cell stack 12 can include a greater or lesser number of fuel cell assemblies to provide more or less power, respectively.

Figure 2:
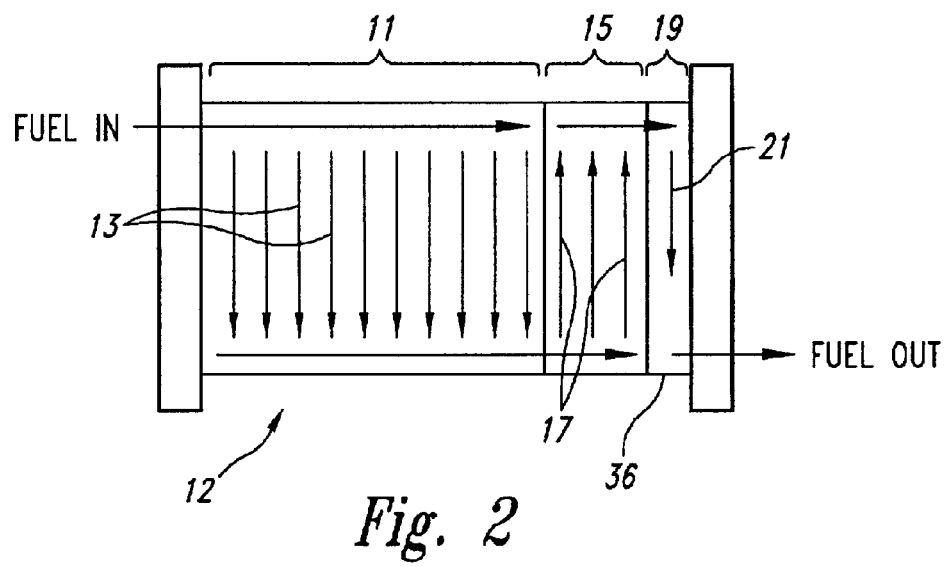
FIG. 2 is a schematic diagram representing fuel flow through a cascaded fuel cell stack of the fuel cell system of FIG. 1.

As shown in FIG. 2, fuel is directed through fuel cell stack 12 in a cascaded flow pattern. A first set 11 composed of the first forty-three fuel cell assemblies 16 are arranged so that fuel flows within the set in a concurrent parallel direction (represented by arrows 13) that is generally opposite the direction of the flow of coolant through fuel cell stack 12. Fuel flow through a next set 15 of two fuel cell assemblies 16 is in series with respect to the flow of fuel in the first set 11, and in a concurrent parallel direction within the set 15 (in a direction represented by arrows 17) that is generally concurrent with the direction of the flow of coolant through fuel cell stack 12. Fuel flow through a final set 19 of two fuel cells assemblies 16 is in series with respect to the first and second sets 11, 15, and in a concurrent parallel direction within the set 19 (in a direction represented by arrow 21) generally opposite the flow of coolant through fuel cell stack 12. The oxidant is supplied to each of the forty-seven fuel cells in parallel, in the same general direction as the flow of coolant through fuel cell stack 12.

The final set 19 of fuel cell assemblies 16 comprises the purge cell portion 36 of the fuel cell stack. The purge cell portion 36 accumulates non-reactive components which are periodically vented by opening a purge valve.

Each membrane electrode assembly 20 is designed to produce a nominal potential difference of about 0.6 V between anode 22 and cathode 24. Reactants (hydrogen and air) are supplied to electrodes 22, 24 on either side of ion exchange membrane 26 through reactant channels 30. Hydrogen is supplied to anode 22, where platinum catalyst 27 promotes its separation into protons and electrons, which pass as useful electricity through an external circuit (not shown). On the opposite side of membrane electrode assembly 20, air flows through reactant channels 30 to cathode 24 where oxygen in the air reacts with protons passing through the ion exchange membrane 26 to produce product water.

Fuel Cell System Sensors and Actuators

With continuing reference to FIG. 1, electronic monitoring and control system 14 comprises various electrical and electronic components on a circuit board 38 and various sensors 44 and actuators 46 distributed throughout fuel cell system 10. Circuit board 38 carries a microprocessor or microcontroller 40 that is appropriately programmed or configured to carry out fuel cell system operation. Microcontroller 40 can take the form of an Atmel AVR RISC microcontroller available from Atmel Corporation of San Jose, Calif. Electronic monitoring and control system 14 also includes a persistent memory 42, such as an EEPROM portion of microcontroller 40 or discrete nonvolatile controller-readable media.

Microcontroller 40 is coupled to receive input from sensors 44 and to provide output to actuators 46. The input and/or output can take the form of either digital and/or analog signals. A rechargeable battery 47 powers the electronic monitoring and control system 14 until fuel cell stack 12 can provide sufficient power to the electronic monitoring and control system 14. Microcontroller 40 is selectively couplable between fuel cell stack 12 and battery 47 for switching power during fuel cell system operation and/or to recharge battery 47 during fuel cell operation.

Figure 3:
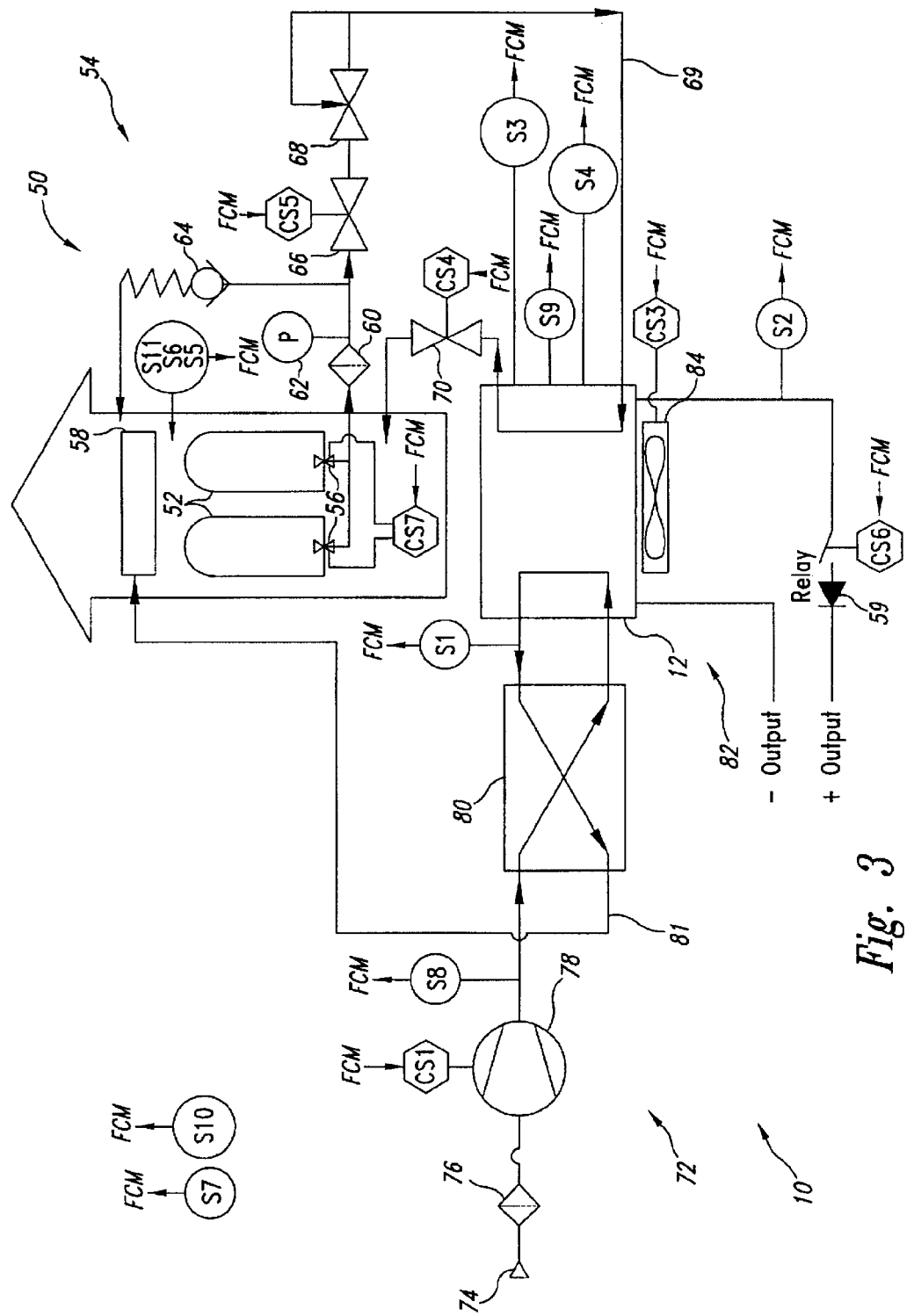
FIG. 3 is a schematic diagram of a portion of the fuel cell monitoring and control system of FIG. 1.

FIG. 3 show various elements of fuel cell system 10 in further detail, and shows various other elements that were omitted from FIG. 1 for clarity of illustration.

With particular reference to FIG. 3, fuel cell system 10 provides fuel (e.g., hydrogen) to the anode 22 by way of a fuel system 50. The fuel system 50 includes a source of fuel such as one or more fuel tanks 52, and a fuel regulating system 54 for controlling delivery of the fuel. Fuel tanks 52 can contain hydrogen, or some other fuel such as methanol. Alternatively, fuel tanks 52 can represent a process stream from which hydrogen can be derived by reforming, such as methane or natural gas (in which case a reformer is provided in fuel cell system 10).

Fuel tanks 52 each include a fuel tank valve 56 for controlling the flow of fuel from respective fuel tank 52. Fuel tank valves 56 may be automatically controlled by microcontroller 40, and/or manually controlled by a human operator. Fuel tanks 52 may be refillable, or may be disposable. Fuel tanks 52 may be integral to fuel system 50 and/or fuel cell system 10, or can take the form of discrete units. In this embodiment, fuel tanks 52 are hydride storage tanks. Fuel tanks 52 are positioned within fuel cell system 10 such that they are heatable by exhaust cooling air warmed by heat generated by fuel cell stack 12. Such heating facilitates the release of hydrogen from the hydride storage media.

The fuel system 50 includes a hydrogen concentration sensor S5, hydrogen heater current sensor S6 and a hydrogen sensor check sensor S11. Hydrogen heater current sensor S6 can take the form of a current sensor that is coupled to monitor a hydrogen heater element that is an integral component of hydrogen concentration sensor S5. Hydrogen sensor check sensor S11 monitors voltage across a positive leg of a Wheatstone bridge in a hydrogen concentration sensor S5, discussed below, to determine whether hydrogen concentration sensor S5 is functioning.

Fuel tanks 52 are coupled to the fuel regulating system 54 through a filter 60 that ensures that particulate impurities do not enter fuel regulating system 54. Fuel regulating system 54 includes a pressure sensor 62 to monitor the pressure of fuel in fuel tanks 52, which indicates how much fuel remains in fuel tanks 52. A pressure relief valve 64 automatically operates to relieve excess pressure in fuel system 50. Pressure relief valve 64 can take the form of a spring and ball relief valve. A main gas valve solenoid CS5 opens and closes a main gas valve 66 in response to signals from microcontroller 40 to provide fluid communication between fuel tanks 52 and fuel regulating system 54. Additional solenoids CS7 control flow through the fuel tank valves 56. A hydrogen regulator 68 regulates the flow of hydrogen from fuel tanks 52. Fuel is delivered to the anodes 22 of the fuel cell assemblies 16 through a hydrogen inlet conduit 69 that is connected to fuel stream inlet port of stack 12.

Sensors 44 of fuel regulating system 54 monitor a number of fuel cell system operating parameters to maintain fuel cell system operation within acceptable limits. For example, a stack voltage sensor S3 measures the gross voltage across fuel cell stack 12. A purge cell voltage sensor S4 monitors the voltage across purge cell portion 36 (the final set 19 of fuel cell assemblies 16 in cascaded design of FIG. 2). A cell voltage checker S9 ensures that a voltage across each of the fuel cells 20 is within an acceptable limit. Each of the sensors S3, S4, S9 provide inputs to microcontroller 40, identified in FIG. 3 by arrows pointing toward the blocks labeled "FCM" (i.e., fuel cell microcontroller 40).

A fuel purge valve 70 is provided at the fuel stream outlet port 35 of fuel cell stack 12 and is typically in a closed position when stack 12 is operating. Fuel is thus supplied to fuel cell stack 12 only as needed to sustain the desired rate of electrochemical reaction. Because of the cascaded flow design, any impurities (e.g. nitrogen) in the supply fuel stream tend to accumulate in purge cell portion 36 during operation. A build-up of impurities in purge cell portion 36 tends to reduce the performance of purge cell portion 36; should the purge cell voltage sensor S4 detect a performance drop below a threshold voltage level, microcontroller 40 may send a signal to a purge valve controller CS4 such as a solenoid to open the purge valve 36 and discharge the impurities and other non-reactive components that may have accumulated in purge cell portion 36 (collectively referred to as "purge discharge"). The venting of hydrogen during a purge is limited, to prevent the monitoring and control systems 14, discussed below, from triggering a failure or fault.

Fuel cell system 10 provides oxygen in an air stream to the cathode side of membrane electrode assemblies 20 by way of an oxygen delivery system 72. A source of oxygen or air 74 can take the form of an air tank or the ambient atmosphere. A filter 76 ensures that particulate impurities do not enter oxygen delivery system 72. An air compressor controller CS1 controls an air compressor 78 to provide the air to fuel cell stack 12 at a desired flow rate. A mass air flow sensor S8 measures the air flow rate into fuel cell stack 12, providing the value as an input to microcontroller 40. A humidity exchanger 80 adds water vapor to the air to keep the ion exchange membrane 26 moist. Humidity exchanger 80 also removes water vapor which is a byproduct of the electrochemical reaction. Excess liquid water is provided to an evaporator 58 via conduit 81.

Fuel cell system 10 removes excess heat from fuel cell stack 12 and uses the excess heat to warm fuel in fuel tanks 52 by way of a cooling system 82. Cooling system 82 includes a fuel cell temperature sensor S1, for example a thermister that monitors the core temperature of fuel cell stack 12. The temperature is provided as input to microcontroller 40. A stack current sensor S2, for example a Hall sensor, measures the gross current through fuel cell stack 12, and provides the value of the current as an input to microcontroller 40. A cooling fan controller CS3 controls the operation of one or more cooling fans 84 for cooling fuel cell stack 12. After passing through fuel cell stack 12, the warmed cooling air circulates around fuel tanks 52 to warm the fuel. The warmed cooling air then passes through the evaporator 58. A power relay controller CS6 such as a solenoid connects, and disconnects, the fuel cell stack to, and from, an external circuit in response to microcontroller 40. A power diode 59 provides one-way isolation of fuel cell system 10 from the external load to provide protection to fuel cell system 10 from the external load. A battery relay controller CS8 connects, and disconnects, fuel cell monitoring and control system 14 between fuel cell stack 12 and battery 47.

The fuel cell monitoring and control system 14 (illustrated in FIG. 4) includes sensors for monitoring fuel cell system 10 surroundings and actuators for controlling fuel cell system 10 accordingly. For example, a hydrogen concentration sensor S5 (shown in FIG. 3) for monitoring the hydrogen concentration level in the ambient atmosphere surrounding fuel cell stack 12. The hydrogen concentration sensor S5 can take the form of a heater element with a hydrogen sensitive thermister that may be temperature compensated. An oxygen concentration sensor S7 (illustrated in FIG. 4) to monitor the oxygen concentration level in the ambient atmosphere surrounding fuel cell system 10. An ambient temperature sensor S10 (shown in FIG. 3), for example a digital sensor, to monitor the ambient air temperature surrounding fuel cell system 10.

Figure 4:
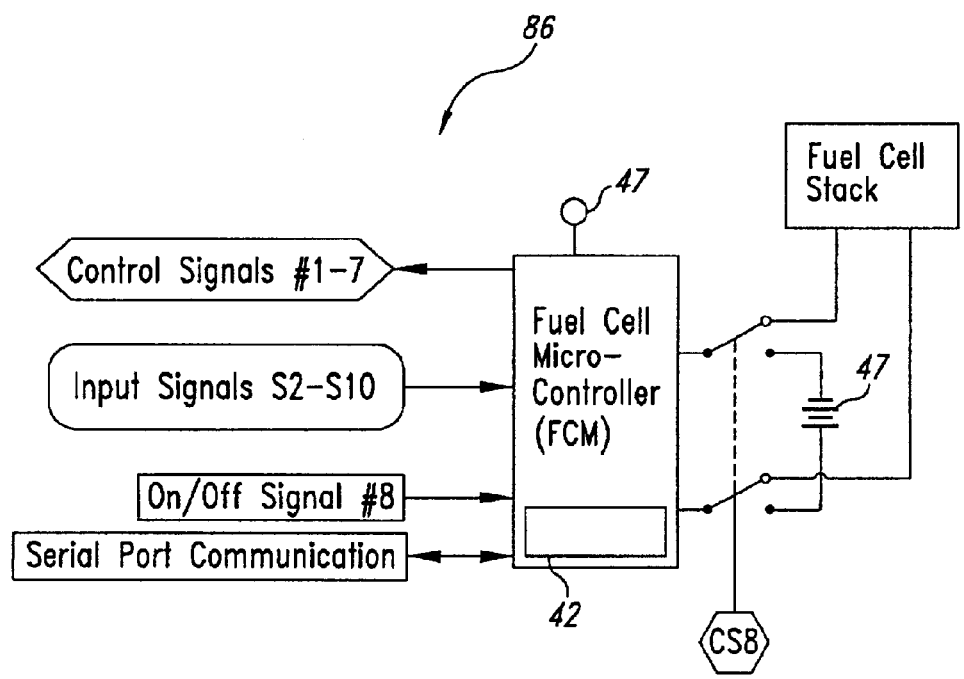
FIG. 4 is a schematic diagram of an additional portion of the fuel cell monitoring and control system of FIG. 3, including a fuel cell microcontroller selectively coupled between the fuel cell stack and a battery.

With reference to FIG. 4, microcontroller 40 receives the various sensor measurements such as ambient air temperature, fuel pressure, hydrogen concentration, oxygen concentration, fuel cell stack current, air mass flow, cell voltage check status, voltage across the fuel cell stack, and voltage across the purge cell portion of the fuel cell stack from various sensors described below. Microcontroller 40 provides the control signals to the various actuators, such as air compressor controller CS1, cooling fan controller CS3, purge valve controller CS4, main gas valve solenoid CS5, power circuit relay controller CS6, hydride tank valve solenoid CS7, and battery relay controller CS8.

Fuel Cell System Structural Arrangement

FIGS. 5–8 illustrate the structural arrangement of the components in fuel cell system 10. For convenience, "top," "bottom," "above," "below" and similar descriptors are used merely as points of reference in the description, and while corresponding to the general orientation of the fuel cell system 10 during operation, are not to be construed to limit the orientation of fuel cell system 10 during operation or otherwise.

Figure 5:
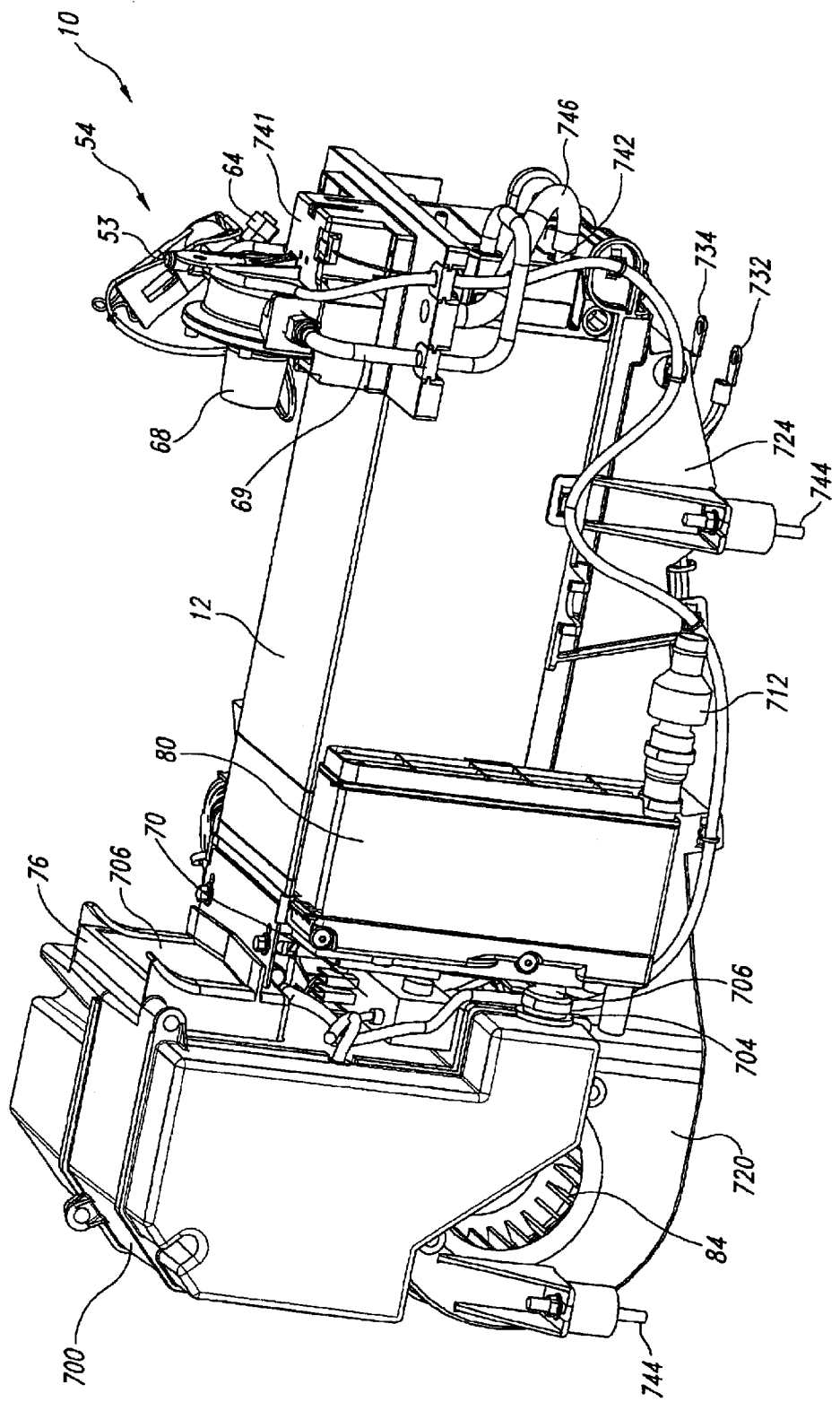
FIG. 5 is a top, right isometric view of a structural arrangement of various components of the fuel cell system of FIG. 1.
Figure 6:
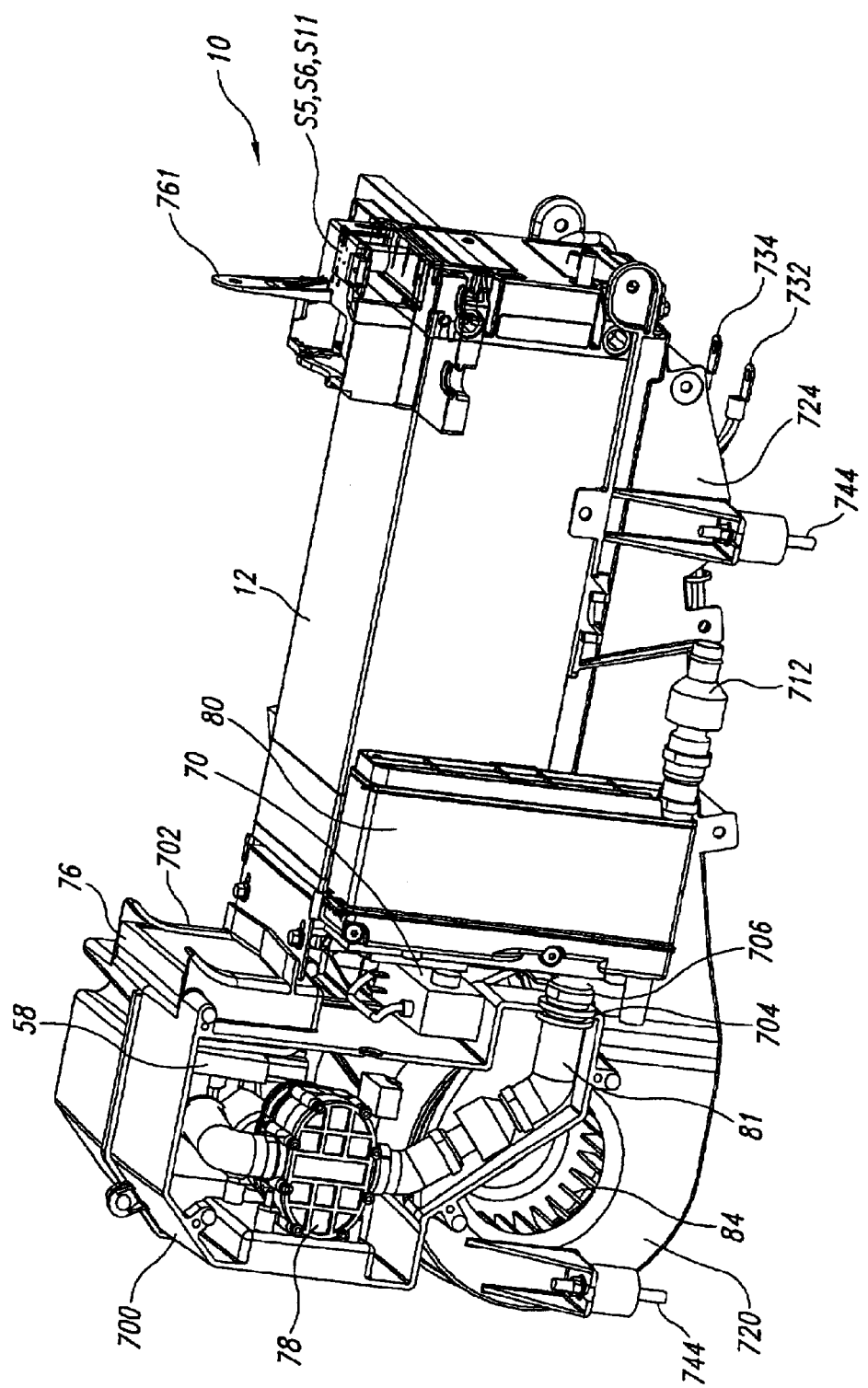
FIG. 6 is a top, right isometric view of the structural arrangement of various components of the fuel cell system of FIG. 5 with a cover removed.
Figure 7:
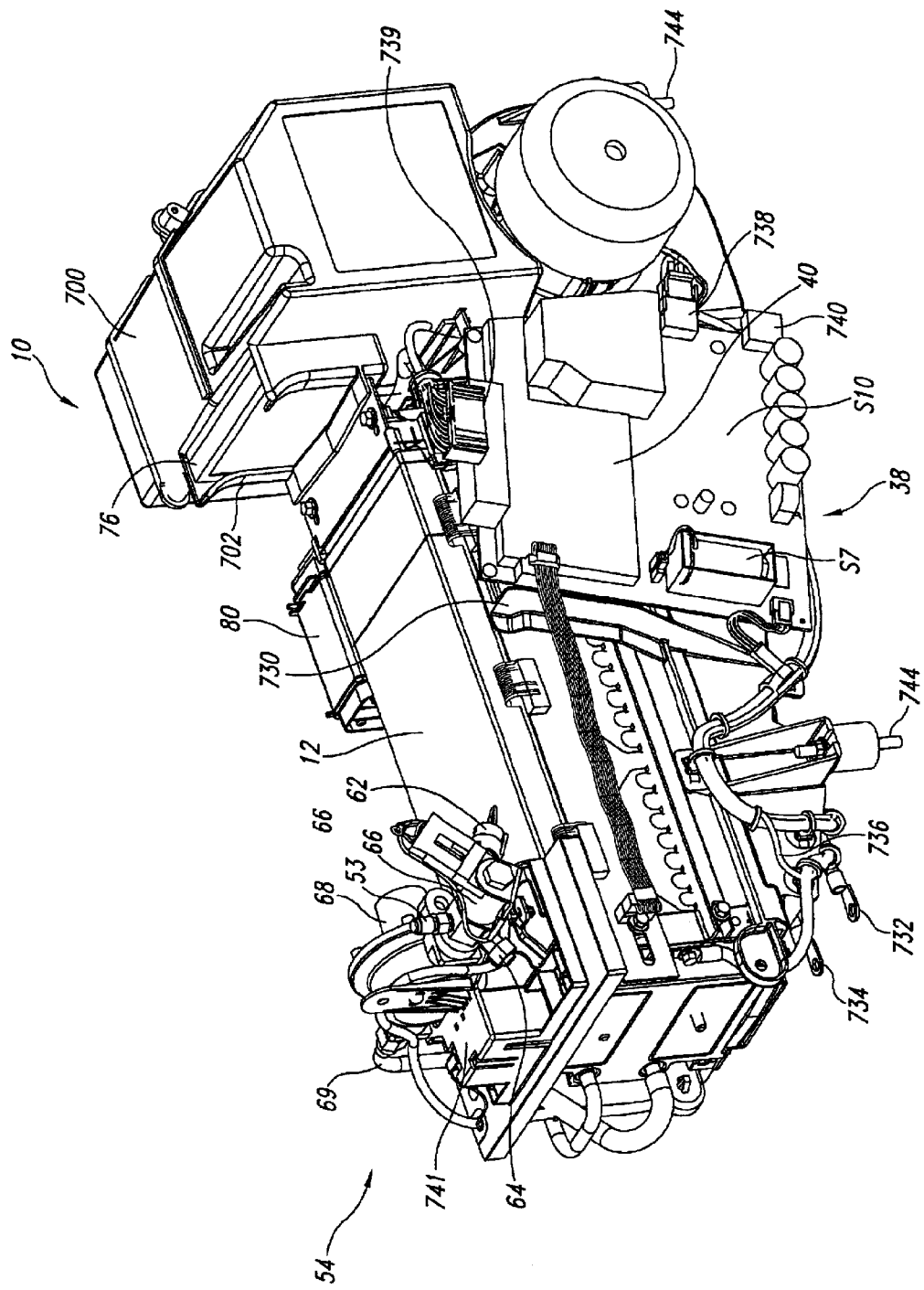
FIG. 7 is top, left isometric view of the structural arrangement of various components of the fuel cell system of FIG. 5.

Referring to FIGS. 5–7, air compressor 78 and cooling fan 84 are grouped together at one end ("air supply end") of fuel cell stack 12. Fuel tanks 52 (not shown in FIGS. 5–7) are mountable to fuel cell system 10 on top of, and along the length of, fuel cell stack 12. The components of fuel regulating system 54 upstream of fuel cell stack 12 are located generally at the end of stack 12 ("hydrogen supply end") opposite the air supply end.

Air compressor 78 is housed within an insulated housing 700 that is removably attached to fuel cell stack 12 at the air supply end. Housing 700 has an air supply aperture 702 covered by the filter 76 that allows supply air into housing 700. Air compressor 78 is a positive displacement low pressure type compressor and is operable to transmit supply air to air supply conduit 81 at a flow rate controllable by the operator. An air supply conduit 81 passes through a conduit aperture 704 in compressor housing 700 and connects with an air supply inlet 706 of humidity exchanger 80. Mass flow sensor S8 is located on the air supply conduit 81 upstream of the humidity exchanger 81 and preferably within the compressor housing 700.

Humidity exchanger 80 may be of the type disclosed in U.S. Pat. No. 6,106,964, and is mounted to one side of fuel cell stack 12 near the air supply end. Air entering into the humidity exchanger 80 via the air supply conduit 81 is humidified and then exhausted from the humidity exchanger 80 and into fuel cell stack 12 (via the supply air inlet port of the end plate 18b). Exhaust air from fuel cell stack 12 exits via the exhaust air outlet port in end plate 18b and into the humidity exchanger 80, where water in the air exhaust stream is transferred to the air supply stream. The air exhaust stream then leaves the humidity exchanger 80 via the air exhaust outlet 712 and is transmitted via an air exhaust conduit (not shown) to the evaporator 58 (not shown in FIGS. 5–7) mountable to a cover (not shown) above fuel cell stack 12.

Cooling fan 84 is housed within a fan housing 720 that is removably mounted to the air supply end of fuel cell stack 12 and below compressor housing 700. Fan housing 720 includes a duct 724 that directs cooling air from the cooling fan 84 to the cooling channel openings at the bottom of fuel cell stack 12. Cooling air is directed upwards and through fuel cell stack 12 via the cooling channels 30 and is discharged from the cooling channel openings at the top of fuel cell stack 12. During operation, heat extracted from fuel cell stack 12 by the cooling air is used to warm fuel tanks 52 that are mountable directly above and along the length of stack 12. Some of the warmed cooling air can be redirected into air supply aperture 702 of the compressor housing 700 for use as oxidant supply air.

Referring particularly to FIG. 7, circuit board 38 carrying microcontroller 40, oxygen sensor S7 and ambient temperature sensor S10 is mounted on the side of fuel cell stack 12 opposite humidity exchanger 80 by way of a mounting bracket 730. Positive and negative electrical power supply lines 732, 734 extend from each end of fuel cell stack 12 and are connectable to an external load. An electrically conductive bleed wire 736 from each of the power supply lines 732, 734 connects to the circuit board 38 at a stack power in terminal 738 and transmits some of the electricity generated by fuel cell stack 12 to power the components on the circuit board 38, as well as sensors 44 and actuators 46 which are electrically connected to circuit board 38 at terminal 739. Similarly, battery 47 (not shown in FIGS. 5–7) is electrically connected to circuit board 38 at battery power in terminal 740. Battery 47 supplies power to the circuit board components, sensors 44 and actuators 46 when fuel cell stack output has not yet reached nominal levels (e.g., at start-up); once fuel cell stack 12 has reached nominal operating conditions, fuel cell stack 12 can also supply power to recharge battery 47.

Figure 8:
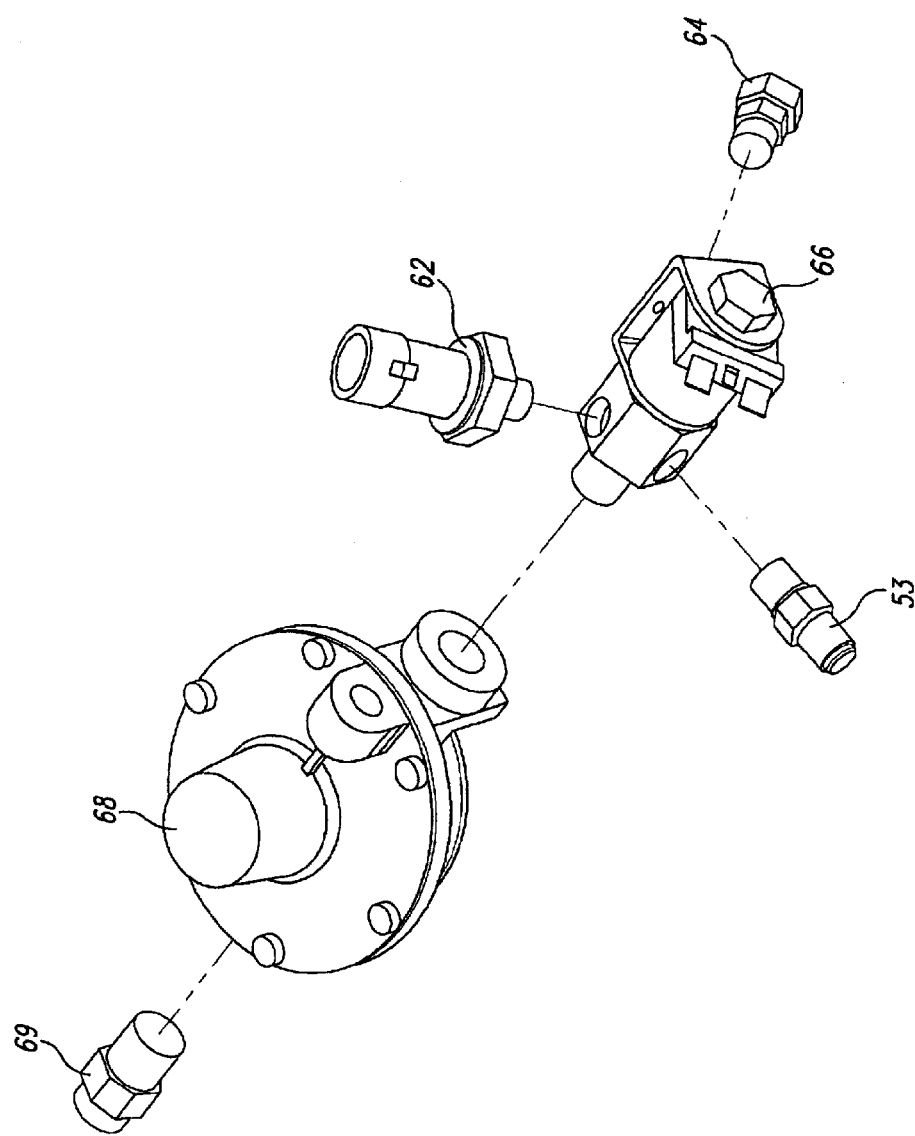
FIG. 8 is a top, right isometric view of a pressure regulator portion of the fuel cell system of FIG. 5.

Referring generally to FIGS. 5–7 and particularly to FIG. 8, a bracket 741 is provided at the hydrogen supply end for the mounting of a fuel tank valve connector 53, hydrogen pressure sensor 62, pressure relief valve 64, main gas valve 66, and hydrogen pressure regulator 68 above fuel cell stack 12 at the hydrogen supply end. A suitable pressure regulator may be a Type 912 pressure regulator available from Fisher Controls of Marshalltown, Iowa. A suitable pressure sensor may be a transducer supplied Texas Instruments of Dallas, Tex. A suitable pressure relief valve may be supplied by Schraeder-Bridgeport of Buffalo Grove, Ill. The pressure relief valve 64 is provided for the fuel tanks 52 and may be set to open at about 350 psi. A low pressure relief valve 742 is provided for fuel cell stack 12. Bracket 741 also provides a mount for hydrogen concentration sensor S5, hydrogen heater current sensor S6 and hydrogen sensor check sensor S11, which are visible in FIG. 6 in which the bracket 741 is transparently illustrated in hidden line. Fuel tanks 52 are connectable to the fuel tank connector 53. When the fuel tank and main gas valves 56, 66 are opened, hydrogen is supplied under a controlled pressure (monitored by pressure sensor 62 and adjustable by hydrogen pressure regulator 68) through the fuel supply conduit 69 to the fuel inlet port of end plate 18a. The purge valve 70 is located at the fuel outlet port at end plate 18b.

Fuel cell system 10 and fuel tanks 52 are coupled to a base (not shown) at mounting points 744 and housed within a fuel cell system cover (not shown). Cooling air exhausted from the top of fuel cell stack 12 is thus directed by the cover either to the supply air inlet 702 or over fuel regulating system 54 to a cooling air discharge opening in the housing.

Fuel cell system 10 is designed so that components that are designed to discharge hydrogen or that present a risk of leaking hydrogen, are as much as practical, located in the cooling air path or have their discharge/leakage directed to the cooling air path. The cooling air path is defined by duct 724, cooling air channels of stack 12, and the portion of the system cover above stack 12. The components directly in the cooling air path include fuel tanks 52, and components of fuel regulating system 54 such as pressure relief valve 64, main gas valve 66, and hydrogen regulator 68. Components not directly in the cooling air path are fluidly connected to the cooling air path, and include purge valve 70 connected to duct 724 via purge conduit (not shown) and low pressure relief valve 742 connected to an outlet near fuel regulating system 54 via conduit 746. When cooling air fan 84 is operational, the cooling air stream carries leaked/discharged hydrogen through duct 724, past stack 12, and out of system 10. Hydrogen concentration sensor S5 is strategically placed as far downstream as possible in the cooling air stream to detect hydrogen carried in the cooling air stream. Hydrogen concentration sensor S5 is also placed in the vicinity of the components of fuel regulating system 54 to improve detection of hydrogen leaks/discharges from fuel regulating system 54.

Exemplary Method of Operation

Fuel cell system 10 can employ a number of operating states that may determine which operations or tasks microcontroller 40 executes, and may determine the response of microcontroller 40 to various readings or measurements of the fuel cell system operating parameters. Microcontroller 40 executes software that can be programmed into and executed from an on-chip flash memory of microcontroller 40 or in other controller-readable memory. In particular, fuel cell system 10 can employ a standby state, starting state, running state, warning state, failure state, and stopping state.

In a standby state, fuel cell stack 12 is not operating and microcontroller 40 monitors a startline for a startup signal. For example, operator activation of a start button or switch (not shown) can generate the startup signal on the startup line.

In a starting state, microcontroller 40 initializes itself, places all actuators and control devices in their proper initial states, enables a serial interface, starts a watchdog timer, and performs a series of checks to ensure that all systems and components are operational. If the outcomes of the checks are satisfactory, microcontroller 40 causes the external load to be connected and enters a running state, otherwise fuel cell system 10 enters a failure state without becoming operational.

In a running state, fuel and oxidant are supplied to the fully operational fuel cell stack 12. Microcontroller 40 monitors the performance of fuel cell system 10 based on the measured operating parameters, and controls the various systems via the various actuators discussed above. If microcontroller 40 determines that one or more operating parameters are outside of a warning range, microcontroller 40 places fuel cell system 10 into the warning state. If microcontroller 40 determines that one or more operating parameters are outside of a failure range, microcontroller 40 places the fuel cell system into the failure state. Otherwise, fuel cell system 10 continues in a running state until a stop signal is received on the startup line. In response to the stop signal, microcontroller 40 advances fuel cell system 10 from a running state to a stopping state if fuel cell system 10 has been in a running state for at least one minute. If so, the microcontroller 40 begins an extended shutdown procedure lasting approximately 45 seconds, during which time the fuel cell system 12 is in a stopping state. If not, microcontroller 40 engages the normal shutdown procedure and fuel cell system 10 proceeds directly from a running state to a standby state.

In a warning state, microcontroller 40 can provide a warning notification of the out-of-warning range condition to the operator, but otherwise fuel cell system 10 continues to operate. Additionally, microcontroller 40 can write a warning condition code corresponding to the out-of-warning range condition to the persistent memory 42.

In a failure state, microcontroller 40 immediately stops operation of the fuel cell system 10 and writes a fault condition code to the persistent memory 42. Fuel cell system 10 remains in the failure state until a stop signal is received on the startline. In response to the stop signal, microcontroller 40 completes the shut down of fuel cell system 10 and places fuel cell system 10 into a standby state.

In a stopping state, microcontroller 40 shuts down the various components of fuel cell system 10, stopping operation of fuel cell system 10. Once the various components have been shut down, microcontroller 40 places fuel cell system 10 into a standby state.

Structure and Method of Switching Between Fuel Cell Stack and Battery

A battery 47, such as a 24 Volt battery, is used to start fuel cell system 10. Once fuel cell system 10 is operational, power can be supplied from fuel cell stack 12 to operate the controller, valves and pumps that supply fuel cell stack 12 with fuel and air, thus preventing drain on battery 47 during normal operation of system 10.

Figure 9:
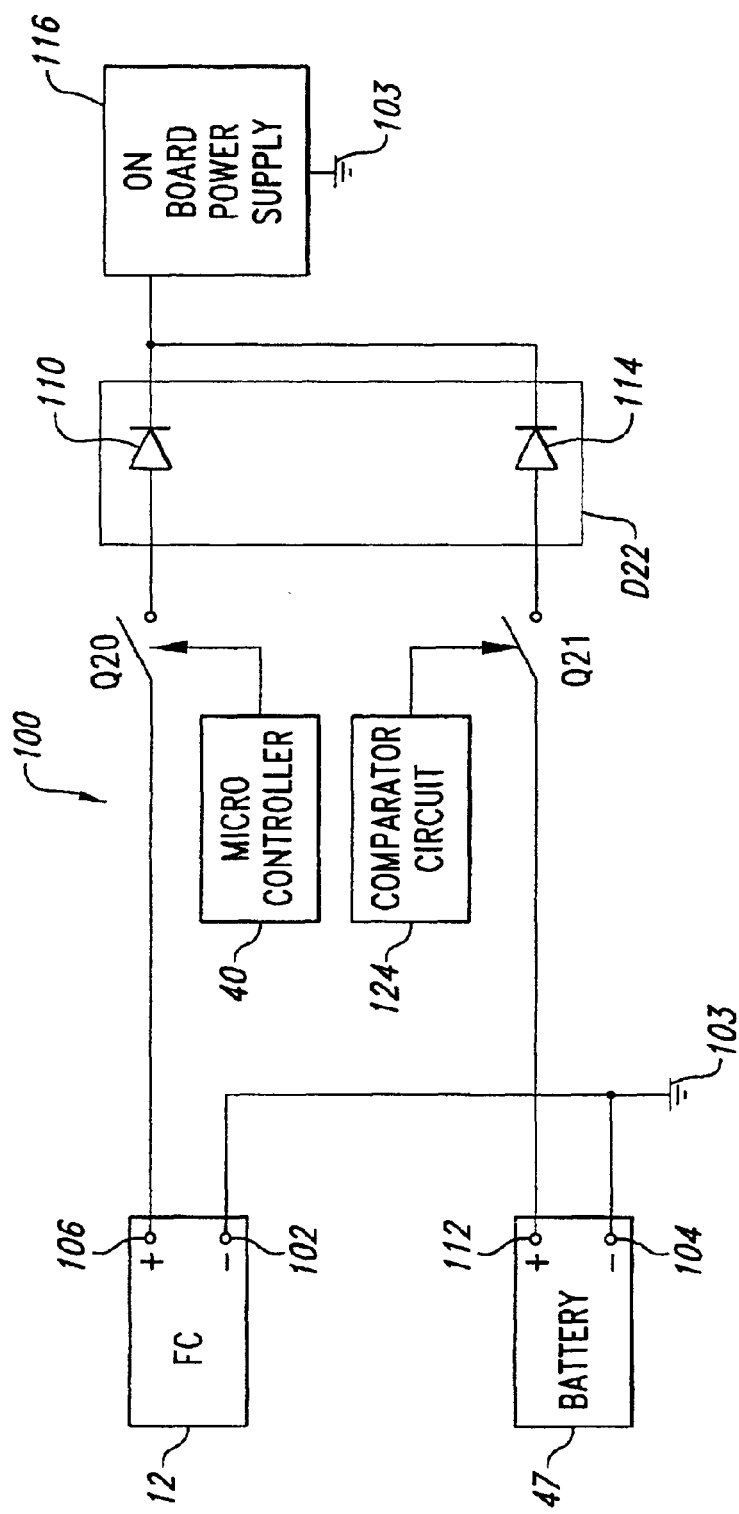
FIG. 9 is a high level electrical schematic of a power switching portion of the fuel cell monitoring and control system of FIG. 1.

FIG. 9 shows a high level representation of an electrical circuit 100 for automatically switching between fuel cell stack 12 and battery 47 for providing power to an on-board power supply 116. The on-board power supply 116 supplies power to the various sensors and actuators and other components of fuel cell system 10 requiring electrical power, including microcontroller 40.

Figure 10A:
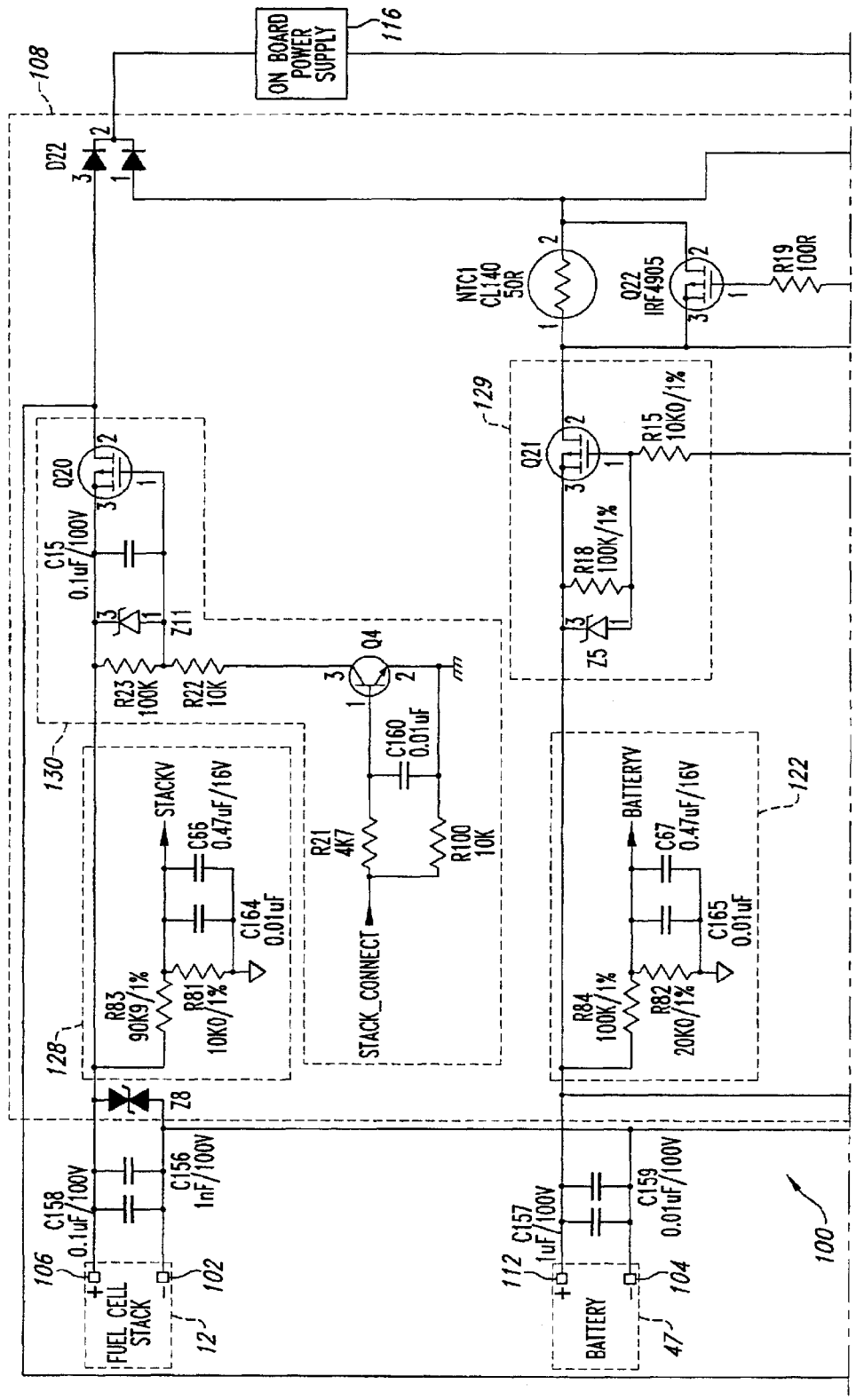
FIGS. 10A and 10B are a low level electrical schematic of a power switching portion of the fuel cell monitoring and control system of FIG. 1.
Figure 10B:
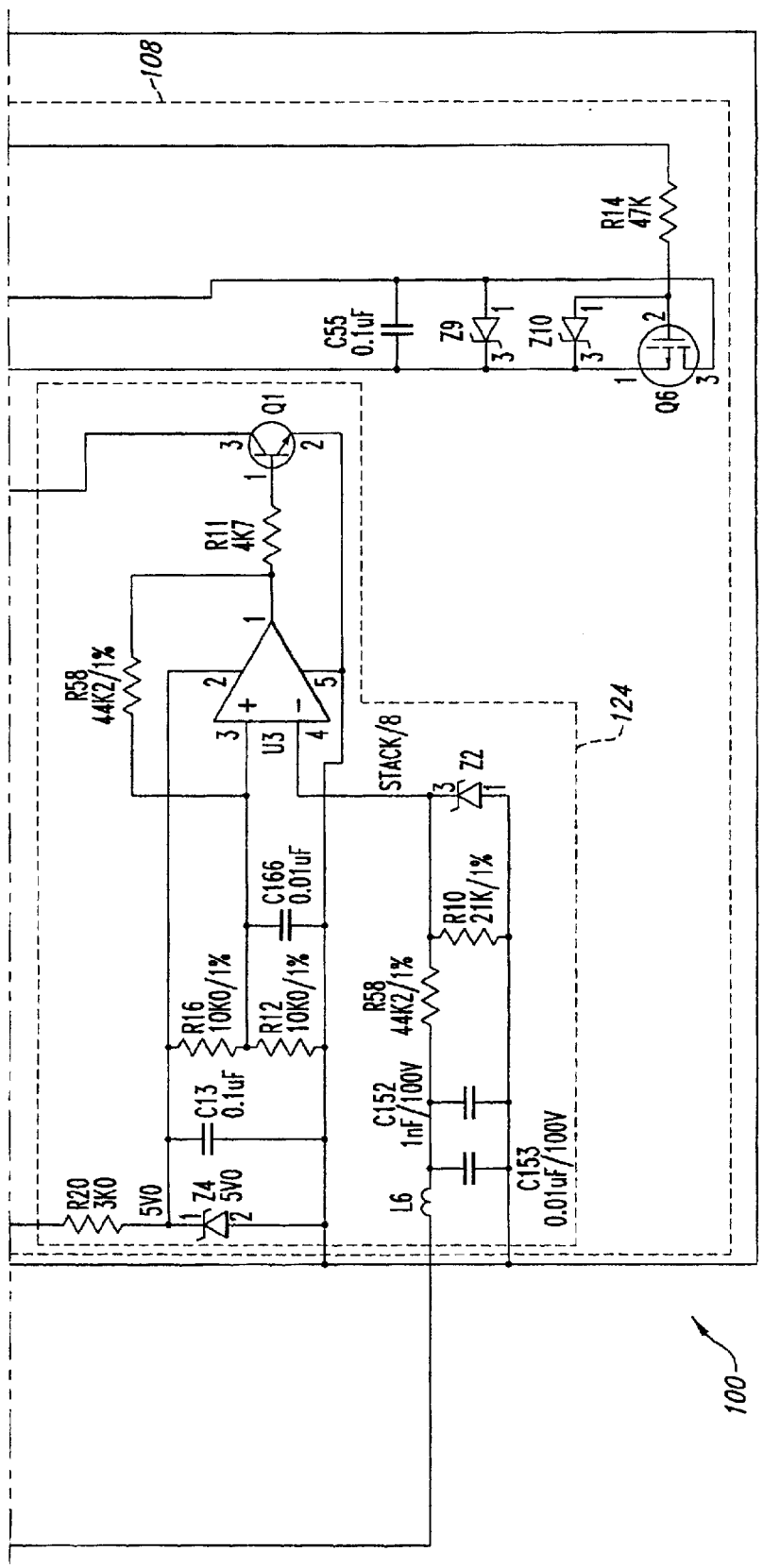

The negative terminal 102 of fuel cell stack 12 and the negative terminal 104 of battery 47 are each coupled to a common ground 103. The positive terminal 106 of fuel cell stack 12 is coupled to on-board power supply 116 through a first diode 110 of a "diode-OR" circuit D22 (FIGS. 9, 10A and 10B). The positive terminal 112 of battery 47 is coupled to on-board power supply 116 through a second diode 114 of the diode-OR circuit D22. The diode-OR circuit D22 automatically extracts power from the source (i.e., battery 47 or fuel stack 12) with the highest voltage. Thus, the diode-OR circuit D22 can automatically switch between fuel cell stack 12 and battery 47 as power sources. While microcontroller 40 could control power switching using instructions stored in an internal or external memory or registers, the diode-OR circuit D22 provides faster switching then would be possible using microcontroller 40 which typically must perform a variety of other tasks.

Normally, the stack voltage significantly exceeds the battery voltage while fuel cell stack 12 is operating. However, the stack voltage may fall below the battery voltage when fuel cell stack 12 is coupled to a particularly heavy load. This would cause battery 47 to power fuel cell system 10, possibly draining battery 47 and preventing fuel cell system 10 startup after a normal shutdown.

The system can be configured to allow fuel cell stack 10 to power fuel cell system 10 even when the stack voltage is below that of battery 47. For example, the electrical circuit 100 includes a comparator circuit 124 that compares the stack voltage to a first threshold stack voltage, for example 22V in a 47-cell series stack with a 24 V battery (i.e., $V_{High}$). If the stack voltage rises above the first threshold voltage, comparator circuit 124 causes a battery supply switch Q21 to open, decoupling battery 47 from the on-board power supply 116. A comparator hysteresis circuit prevents the battery supply switch Q21 from closing again until the stack voltage falls below a second threshold stack voltage ($V_{Low}$), less than the first threshold stack voltage, for example 18V in a 47-cell series stack with a 24V battery. Alternatively, the electrical circuit 100 can employ a single stack voltage threshold (i.e., $V_{High}=V_{Low}$), although such can lead to an inordinate amount of switching where the voltage across fuel cell stack 12 fluctuates around the selected threshold value.

A stack supply switch Q20 is directly controlled by microcontroller 40. In a starting state, microcontroller 40 places the stack supply switch Q20 in the OPEN state, preventing loads on fuel cell stack 12 until the voltage of fuel cell stack 12 has stabilized. The comparator circuit 128 sensing the stack voltage at the output of the stack supply switch Q20, places the battery supply switch Q21 in the CLOSED state, coupling the on-board power supply 116 to battery 47.

When microcontroller 40 determines that the voltage across the fuel cell stack has reached a third threshold voltage (greater than the first threshold), for example 38 volts in a 47-cell series stack, microcontroller 40 places the stack supply switch Q20 into the CLOSED state, coupling fuel cell stack 12 to the diode-OR circuit D22. With the stack supply switch Q20 CLOSED, the stack voltage is coupled to an input of the comparator circuit 124. Since the stack voltage has risen above the first threshold voltage, the battery supply switch Q21 opens, disconnecting battery 47. The stack voltage can then vary provided it is above the second threshold (e.g. above 18V in the example discussed) without draining battery 47.

If microcontroller 40 determines, by way of the comparator circuit 124, that the voltage across fuel cell stack 12 has fallen below the second threshold voltage, microcontroller 40 places the stack supply switch Q20 in the OPEN state, disconnecting fuel cell stack 12 from the diode-OR circuit D22. Similarly, if microcontroller 40 determines that the user wishes to shut down (i.e., stopping state), or if an operational fault is detected (i.e., failure state), microcontroller 40 also places the stack supply switch Q20 into the OPEN state, disconnecting fuel cell stack 12 from the diode-OR circuit D22.

FIGS. 10A and 10B are a low level electrical schematic showing a portion of the electrical circuit 100 of the electronic fuel cell monitoring and control system 14. A logic control circuit identified by broken line box 108 includes a battery voltage measurement circuit identified by broken line block 122, a stack voltage measuring circuit identified by broken line box 128, a battery supply circuit identified by broken line box 129, a stack supply circuit identified by broken line box 130, the comparator circuit identified by broken line block 124, and the diode-OR circuit D22.

The battery voltage measurement circuit 122 measures the voltage across battery 47, and supplies the measured battery voltage as input to microcontroller 40 identified in FIG. 10 as BATTERYV. The stack voltage measurement circuit 128 determines and sends a measurement of the voltage across fuel cell stack 12 to microcontroller 40, identified in FIG. 10 as STACKV.

Comparator circuit 124 compares the voltage across fuel cell stack 12 to a first threshold voltage threshold, to determine when fuel cell system 10 should switch between battery 47 and fuel cell stack 12 for power. The first threshold value is set by zener diode Z4 and resistors R10, R12, R16, R20, and R57. The output of comparator circuit 124 is applied to the input terminal 1 of the transistor Q1, which in turn controls the second power supply switch Q21.

Stack supply circuit 130 includes the stack supply switch Q20, in the form of a field effect transistor. Stack supply circuit 130 receives a signal from microcontroller 40, identified in FIG. 10 as STACK_CONNECT. Stack supply circuit 130 can switch the on-board power supply 116 between fuel cell stack 12 and battery 47 based on an operating state of fuel cell system 10. For example, stack supply circuit 130 can place the stack supply switch Q20 in the CLOSED state to supply power to the onboard power supply 116 from fuel cell stack 12 when fuel cell system 10 is entering a running state. Stack supply circuit 130 can place the stack supply switch Q20 in the OPEN state to supply power to the onboard power supply 116 from battery 47, when fuel cell system 10 is a non-running state, for example, in a standby state, starting state, stopping state, and/or failure state.

The battery supply circuit 129 includes the battery supply switch Q21 in the form of a field effect transistor. The battery supply switch can disconnect battery 47 from the on-board power supply 116 once the voltage across fuel cell stack 12 achieves the desired threshold, and prevent battery 47 from supplying power until the voltage across fuel cell stack 12 drops below a second threshold voltage, lower than the first threshold voltage.

Thus, logic control circuit 108 can couple power from battery 47 to the on-board power supply 116 until the voltage across fuel cell stack 12 is above a first threshold voltage, for example 22 volts. Logic control circuit 108 then couples power to the on-board power supply 116 from fuel cell stack 12 until the voltage across fuel cell stack 12 falls below a second threshold voltage, less than the first threshold voltage, for example 18 volts. This hysteresis effect prevents excessive oscillations between power sources due to minor fluctuations in the voltage across fuel cell stack 12. Additionally, to eliminate loads on fuel cell stack 12 before the fuel voltage across fuel cell stack 12 has stabilized, logic control circuit 108 may initially couple power from battery 47 to the on-board power supply 116 until the voltage across fuel cell stack 12 reaches a third voltage threshold, for example 38 volts.

Figure 11:
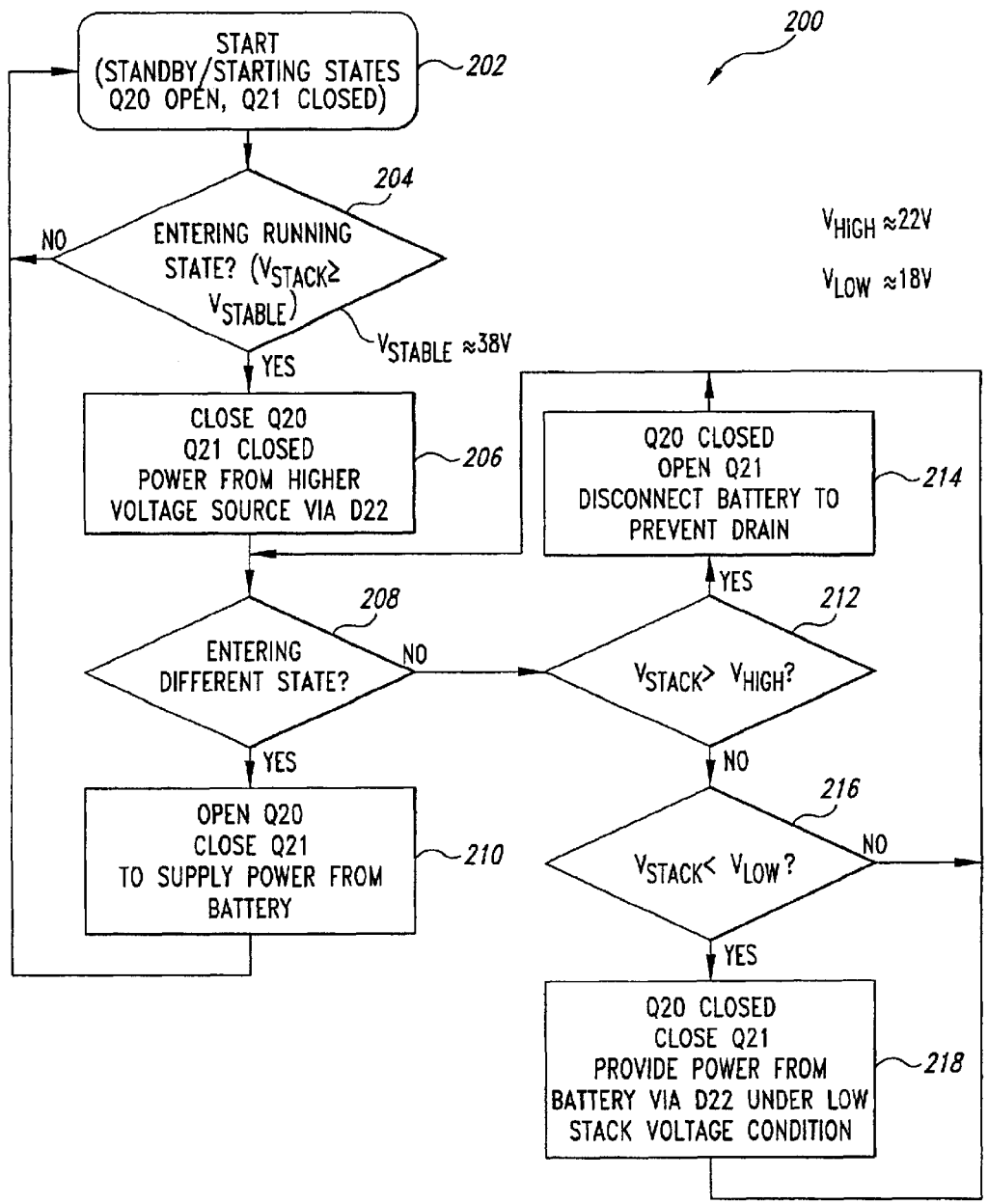
FIG. 11 is a flow diagram showing an exemplary method of switching power source between the fuel cell stack and a battery in the fuel cell system of FIGS. 1 and 2.

FIG. 11 shows a method 200 of switching between fuel cell stack 12 and battery 47 to provide power to the on-board power supply 116 to power fuel cell system 10. The power switching method 200 starts in step 202, where fuel cell system 10 is in a standby state. In the standby state, the stack supply switch Q20 is in the OPEN state and the battery supply switch Q21 is in the CLOSED state to supply power to fuel cell system 10 from battery 47.

In step 204, microcontroller 40 determines if fuel cell system 10 is entering a running state. As a precondition to entering the running state microcontroller 40 determines whether the voltage across fuel cell stack 12 is sufficiently high. Microcontroller 40 can employ a threshold voltage approximately equal to either the minimum voltage required to power fuel cell system 10, or the sum of the voltage required to power fuel cell system 10 and some minimal load. However, microcontroller 40 may employ a higher threshold voltage (i.e., $V_{stable}$) to ensure that the voltage across fuel cell stack 12 is stable before coupling the load to fuel cell stack 12. For example, a threshold voltage of approximately 38 volts may be suitable for the illustrated embodiment.

If fuel cell system 10 is entering a running state, microcontroller 40 may put a 1 or a HIGH logic level on the stack connect line (i.e., STACK_CONNECT) to identify the entry into a running state and to place the stack supply switch Q20 in the closed state. If fuel cell system 10 is not entering a running state, microcontroller 40 executes a wait-loop, returning to step 204.

In response to a 1 or HIGH logic level on the stack connect line STACK_CONNECT, microcontroller 40 places the stack supply switch Q20 in the CLOSED state in step 206. Since the battery supply switch Q21 is also in the CLOSED state, the diode-OR circuit D22 will provide power to the on-board power supply 116 (FIG. 9) from the source 12, 74 having the higher voltage. Typically, fuel cell stack 12 will have the higher voltage, microcontroller 40 having determined in the previous step that fuel cell stack 12 is not experiencing a low voltage condition.

In step 208, microcontroller 40 determines whether fuel cell system 10 is entering a different state, for example, a standby, starting, stopping, and/or failure state. If fuel cell system 10 is entering a different state, microcontroller 40 places the stack supply switch Q20 in the OPEN state in step 210. Thus, the on-board power supply 116 (FIG. 9) will receive power from battery 47. The power switching method 200 then returns to step 202.

If fuel cell system 10 is not entering a different state, logic control circuit 108 of the electronic fuel cell monitoring and control system 14 determines if the voltage across fuel cell stack 12 is greater than the first threshold voltage (i.e., $V_{High}$) in step 212. If the voltage across fuel cell stack 12 is greater than the first threshold voltage, for example 22 volts, control passes to step 214. In step 214, logic control circuit 108 places the battery supply switch Q21 in the OPEN state, disconnecting battery 47 to prevent any drain on battery 47. Control then returns to step 208.

If the voltage across fuel cell stack 12 is not greater than the first threshold voltage, control passes to step 216. In step 216, logic control circuit 108 determines if the voltage across fuel cell stack 12 is less than the second threshold voltage (i.e., $V_{Low}$). If the voltage across fuel cell stack 12 is not less than the second threshold voltage, control returns to 208. If the voltage across fuel cell stack 12 is less than the second threshold voltage, logic control circuit 108 places the battery supply switch Q21 into the CLOSED state in step 218. Since the voltage across fuel cell stack 12 is low, the diode-OR circuit D22 provides power to on-board power supply 116 the from battery 47. Control then returns to step 208.

Thus, logic control circuit 108 of the electronic fuel cell monitoring and control system 14 and microcontroller 40 can monitor the voltage across fuel cell stack 12, and automatically switch power to the on-board power supply 116 based on the operating state of fuel cell system 10 and/or the voltage across fuel cell stack 12. The power switching method 200 may be continuous, or may be performed according to the scheduling generally discussed above, and specifically discussed in commonly assigned U.S. patent application Ser. No. 09/916,240, entitled FUEL CELL SYSTEM METHOD, APPARATUS AND SCHEDULING.

Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other fuel cell systems, not necessarily the PEM fuel cell system described above.

Commonly assigned U.S. patent application Ser. No. 09/916,241, entitled FUEL CELL AMBIENT ENVIRONMENT MONITORING AND CONTROL APPARATUS AND METHOD, now U.S. Pat. No. 6,815,101; Ser. No. 09/916,117, entitled FUEL CELL CONTROLLER SELF INSPECTION; Ser. No. 09/916,115, entitled FUEL CELL ANOMALY DETECTION METHOD AND APPARATUS; Ser. No. 09/916,211, entitled FUEL CELL PURGING METHOD AND APPARATUS; Ser. No. 09/916,213, entitled FUEL CELL RESUSCITATION METHOD AND APPARATUS, now U.S. Pat. No. 6,861,167; Ser. No. 09/916,240, entitled FUEL CELL SYSTEM METHOD, APPARATUS AND SCHEDULING; Ser. No. 09/916,118, entitled PRODUCT WATER PUMP FOR FUEL CELL SYSTEM, now abandoned; and Ser. No. 09/916,212, entitled FUEL CELL SYSTEM HAVING A HYDROGEN SENSOR, all filed Jul. 25, 2001, are incorporated herein by reference, in their entirety.

The various embodiments described above and in the applications and patents incorporated herein by reference can be combined to provide further embodiments. The described methods can omit some acts and can add other acts, and can execute the acts in a different order than that illustrated, to achieve the advantages of the invention.

These and other changes can be made to the invention in light of the above detailed description. In general, in the following claims, the terms used should not be construed to limit the invention to the specific embodiments disclosed in the specification, but should be construed to include all fuel cell systems, controllers and processors, actuators, and sensors that operate in accordance with the claims. Accordingly, the invention is not limited by the disclosure, but instead its scope is to be determined entirely by the following claims.

What is claimed is:

1. A fuel cell system, comprising:
   a fuel cell stack;
   a battery; and
   a fuel cell control system, including a power supply switch responsive to a voltage across the fuel cell stack to couple power from the fuel cell stack to the fuel cell control system at a first time while the voltage across the fuel cell stack is above a fuel cell stack threshold voltage and to couple power from the battery to the fuel cell control system at a second time while the voltage across the fuel cell stack is below the fuel cell stack threshold voltage.

2. The fuel cell system of claim 1 wherein the battery is rechargeable and the fuel cell stack is selectively couplable to provide power to recharge the battery.

3. The fuel cell system of claim 1 wherein the power supply switch is further responsive to an operating state of the fuel cell system.

4. A fuel cell system, comprising:
   a fuel cell stack;
   a battery; and
   a fuel cell control system, including a power supply switch responsive to a voltage across the fuel cell stack to couple power from the fuel cell stack to the fuel cell control system at a first time when the voltage across the fuel cell stack rises above a first fuel cell stack threshold voltage and to couple power from the battery to the fuel cell control system at a second time when the voltage across the fuel cell stack falls below a second fuel cell stack threshold voltage.

5. The fuel cell system of claim 4, further including a second power supply switch responsive to an operating state of the fuel cell system.

6. A fuel cell control system for controlling operation of a fuel cell system having a fuel cell stack, the fuel cell control system comprising:
   a microcontroller;
   at least one sensor positioned to measure an operating parameter of the fuel cell system and coupled to provide signals to the microcontroller corresponding to the measured operating parameter;
   at least one actuator coupled to receive signals from the microcontroller in response to the measured operating parameter; and
   a power switching circuit configured to selectively couple power from the fuel cell stack to the microcontroller at a first time, and to selectively couple power from a battery to the microcontroller at a second time wherein the power switching circuit comprises a voltage responsive switching circuit having an output coupled to the microcontroller, a stack supply switch responsive to an operating state of the fuel cell system to provide an electrical path between the fuel cell stack and the voltage responsive switching circuit and a battery supply switch responsive to a voltage across the fuel cell stack to provide an electrical path between the battery and the voltage responsive switching circuit.

7. The fuel cell control system of claim 6 wherein the battery supply switch is responsive to the voltage across the fuel cell stack in a number of the operating states of the fuel cell system.

8. A fuel cell control system for controlling operation of a fuel cell system having a fuel cell stack, the fuel cell control system comprising:
   a microcontroller;
   at least one sensor positioned to measure an operating parameter of the fuel cell system and coupled to provide signals to the microcontroller corresponding to the measured operating parameter;
   at least one actuator coupled to receive signals from the microcontroller in response to the measured operating parameter; and
   a power switching circuit configured to selectively couple power from the fuel cell stack to the microcontroller at a first time, and to selectively couple power from a battery to the microcontroller at a second time wherein the power switching circuit comprises a diode-OR circuit, a stack supply switch responsive to an operating state of the fuel cell system to provide an electrical path between the fuel cell stack and the diode-OR circuit and a battery supply switch responsive to a voltage across the fuel cell stack to provide an electrical path between the battery and the diode-OR circuit.

9. A fuel cell control system for controlling operation of a fuel cell system having a fuel cell stack, the fuel cell control system comprising:
   a microcontroller;
   at least one sensor positioned to measure an operating parameter of the fuel cell system and coupled to provide signals to the microcontroller corresponding to the measured operating parameter;

at least one actuator coupled to receive signals from the microcontroller in response to the measured operating parameter; and a power supply switch configured to selectively switch power from the fuel cell stack to at least one of the microcontroller, the sensor and the actuator when a voltage across the fuel cell stack is above a first fuel cell stack threshold voltage and to selectively switch power from a battery to at least one of the microcontroller, the sensor and the actuator when the voltage across the fuel cell stack is below a second fuel cell stack threshold voltage, the second fuel cell stack threshold voltage different than the first fuel cell stack threshold voltage.

10. The fuel cell control system of claim 9 wherein the second fuel cell stack threshold voltage is less than the first fuel cell stack threshold voltage.

11. The fuel cell control system of claim 9 wherein the power supply switch comprises:

a diode-OR circuit having a first input, a second input, and an output, the first input couplable to the fuel cell stack, the output coupled to at least one of the microcontroller, the sensor and the actuator;

a battery supply transistor coupled between the battery and the second input of the diode-OR circuit.

12. A fuel cell control system for controlling operation of a fuel cell system having a fuel cell stack, the fuel cell control system comprising:

a microcontroller;

at least one sensor positioned to measure an operating parameter of the fuel cell system and coupled to provide signals to the microcontroller corresponding to the measured operating parameter;

at least one actuator coupled to receive signals from the microcontroller in response to the measured operating parameter; and a power supply switch configured to selectively switch power from the fuel cell stack to the microcontroller in a first operating state when a voltage across the fuel cell stack is above a first fuel cell stack threshold voltage and to selectively switch power from a battery to the microcontroller in the first operating state when the voltage across the fuel cell stack is below a second fuel cell stack voltage.

13. The fuel cell control system of claim 12 wherein the power supply switch comprises:

a diode-OR circuit having a first input, a second input, and an output, the output coupled to at least one of the microcontroller, the sensor and the actuator;

a battery supply transistor coupled between the battery and the first input of the diode-OR circuit; and a fuel cell stack transistor coupled between the fuel cell stack and the second input of the diode-OR circuit.

14. A controller-readable media carrying instructions for causing a controller to control operation of a fuel cell system having a fuel cell stack and a battery, by:

coupling power from the fuel cell stack to the controller when a voltage across the fuel cell stack moves above a first threshold voltage; and coupling power from the battery to the controller when the voltage across the fuel cell stack drops below a second threshold voltage wherein the second threshold voltage is lower than the first threshold voltage.

15. A method of operating a fuel cell system, the method comprising:

providing power from a fuel cell stack to a fuel cell control system at a first time, wherein the first time corresponds to a time when a voltage across the fuel cell stack is above a first threshold voltage; and providing power from a battery to the fuel cell control system at a second time, wherein the second time corresponds to a time when the voltage across the fuel cell stack is below a second threshold voltage, different from the first threshold voltage.

16. The method of claim 15 wherein the first time corresponds to a time when the fuel cell system is in a first operating state and the second time corresponds to a time when the fuel cell system is in a second operating state.

17. The method of claim 15 wherein the first time corresponds to a time when the fuel cell system is in a first operating state and a voltage across the fuel cell stack is above a first threshold voltage, and the second time corresponds to a time when the fuel cell system is in the first operating state and the voltage across the fuel cell stack is below a second threshold voltage.

18. A method of operating a power switching circuit in a fuel cell system to couple power to an on-board power supply selectively from a fuel cell stack and a battery, the method comprising:

changing a state of a stack supply switch to couple the fuel cell stack to the on-board power supply when entering a running operational state of the fuel cell system from a starting operational state of the fuel cell system;

setting a state of a battery supply switch to uncouple the battery from the on-board power supply if a voltage across the fuel cell stack is above an upper fuel cell stack threshold voltage;

setting the state of the battery supply switch to couple power from the battery to the on-board power supply if the voltage across the fuel cell stack falls below a lower fuel cell stack threshold voltage; and changing the state of the battery supply switch to couple the battery to the on-board power supply when entering a stopping operational state of the fuel cell system from the running operational state.

19. The method of claim 18 wherein changing a state of the stack supply switch includes coupling a signal from the controller to a switching input terminal of the stack supply switch.

20. The method of claim 18 wherein the battery supply switch is a transistor and setting a state of the battery supply switch includes coupling a signal from a comparison circuit to a switching input terminal of the transistor.

21. The method of claim 18, further comprising:

coupling the battery supply switch to a first input of a diode-OR circuit; and coupling the stack supply switch to a second input of the diode-OR circuit.

22. The method of claim 18, further comprising:

determining that the voltage across the fuel cell stack exceeds a third threshold voltage before entering a running state.

\* \* \* \* \*